United States Patent
Kato et al.

(10) Patent No.: US 11,428,327 B2
(45) Date of Patent: Aug. 30, 2022

(54) CHECK VALVE

(71) Applicant: KAWASAKI JUKOGYO KABUSHIKI KAISHA, Kobe (JP)

(72) Inventors: Yuki Kato, Akashi (JP); Noritaka Nakamura, Kobe (JP); Kodai Kato, Akashi (JP); Yukinobu Sakata, Kobe (JP); Hiromitsu Kiyose, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 108 days.

(21) Appl. No.: 17/042,735

(22) PCT Filed: Mar. 25, 2019

(86) PCT No.: PCT/JP2019/012427
§ 371 (c)(1),
(2) Date: Sep. 28, 2020

(87) PCT Pub. No.: WO2019/188948
PCT Pub. Date: Oct. 3, 2019

(65) Prior Publication Data
US 2021/0095768 A1    Apr. 1, 2021

(30) Foreign Application Priority Data
Mar. 27, 2018    (JP) .............................. JP2018-060514

(51) Int. Cl.
*F16K 15/02* (2006.01)
*F16K 1/36* (2006.01)
(Continued)

(52) U.S. Cl.
CPC ............ *F16K 1/36* (2013.01); *F16K 27/0209* (2013.01); *F16K 1/42* (2013.01); *F16K 15/025* (2013.01); *F16K 15/063* (2013.01); *F16K 47/02* (2013.01)

(58) Field of Classification Search
CPC .. F16K 15/025; F16K 27/0209; F16K 15/063; F16K 1/36; F16K 1/42; F16K 47/02
(Continued)

(56) References Cited

U.S. PATENT DOCUMENTS 867,702 A * 10/1907 Clarke ................. F16K 15/063
137/514.5
1,691,449 A    11/1928 Sharp
(Continued)

FOREIGN PATENT DOCUMENTS

| CN | 2279487 Y | 4/1998 |
| CN | 102072146 A | 5/2011 |

(Continued)

OTHER PUBLICATIONS

Nov. 26, 2021 Extended European Search Report issued in European Patent Application No. 19775313.0.
(Continued)

*Primary Examiner* — P. Macade Nichols
(74) *Attorney, Agent, or Firm* — Oliff PLC (57) ABSTRACT

There is provided a check valve capable of effectively suppressing the generation of chattering. The check valve includes: a housing including an inlet channel, a valve chest, and an outlet channel; a seat member provided around the inlet channel, the seat member including a seat portion; a valve element pressed against the seat portion to close the inlet channel; a biasing member configured to push the valve element toward a valve seat; a guide portion provided at the housing and configured to guide the valve element when the valve element moves in an axial direction; and a damper chamber communicating with the valve chest through a space between the valve element and the guide portion, the
(Continued)

damper chamber being configured to attenuate axial moving force of the valve element. The biasing member is arranged in the valve chest.

8 Claims, 9 Drawing Sheets

(51) Int. Cl.
*F16K 27/02* (2006.01)
*F16K 1/42* (2006.01)
*F16K 15/06* (2006.01)
*F16K 47/02* (2006.01)

(58) Field of Classification Search
USPC .................................................. 137/514.5
See application file for complete search history.

(56) References Cited

U.S. PATENT DOCUMENTS

| 2,289,946 | A | | 7/1942 | Weatherhead, Jr. |
| 2,969,085 | A | | 1/1961 | Nystrom |
| 3,027,913 | A | * | 4/1962 | Chatham ............... F16K 15/063 |
| | | | | 137/538 |
| 3,595,265 | A | | 7/1971 | Cryder et al. |
| 4,413,688 | A | | 11/1983 | Seaboum |
| 5,240,036 | A | | 8/1993 | Morris |
| 2016/0153583 | A1 | | 6/2016 | Nakamura |

FOREIGN PATENT DOCUMENTS

| CN | 204025792 U | 12/2014 |
| CN | 105393033 A | 3/2016 |
| CN | 205479528 U | 8/2016 |
| DE | 40 29 909 A1 | 3/1992 |
| EP | 2 660 469 A1 | 11/2013 |
| JP | S36-15336 B1 | 9/1961 |
| JP | S50-028031 A | 3/1975 |
| JP | S51-17828 U | 2/1976 |
| JP | H11-325285 A | 11/1999 |
| JP | 2007-292148 A | 11/2007 |
| JP | 2012-140865 A | 7/2012 |

OTHER PUBLICATIONS

Jun. 18, 2019 International Search Report issued in International Patent Application No. PCT/JP2019/012427.

* cited by examiner

CHECK VALVE

TECHNICAL FIELD

The present invention relates to a check valve included in a channel through which a fluid, such as high-pressure gas, flows.

BACKGROUND ART

Conventionally, a check valve is provided in a portion of a pipe through which high-pressure gas or the like flows, to prevent the high-pressure gas from flowing backward. The check valve is opened or closed by a pressure difference between an upstream side and a downstream side. Therefore, when the check valve is provided at a place where steep pressure fluctuation occurs, chattering tends to occur, i.e., the check valve tends to repeatedly open and close in a short cycle.

One example of conventional art of this type of check valve is a check valve including a damper configured to slow rapid movement of a valve element in an axial direction (see PTL 1, for example). This check valve includes the damper incorporating a spring in the valve element. The damper slows the rapid movement of the valve element. Therefore, even when vibration occurs, chattering hardly occurs, i.e., the valve element and a valve seat hardly collide with each other.

CITATION LIST

Patent Literature

PTL 1: Japanese Laid-Open Patent Application Publication No. 2012-140865

SUMMARY OF INVENTION

Technical Problem

From the viewpoint of a chattering frequency of the valve element, as the volume of a damper chamber decreases, damping force increases, which is preferable. However, in the check valve of the conventional art, to prevent an increase in pressure loss by the presence of the spring, the spring is incorporated in the damper chamber, and therefore, the volume of the damper chamber increases. Therefore, the damping force is small.

As a diameter of the damper chamber increases, the damping force increases, which is preferable. However, according to the check valve of the conventional art, since the damper chamber is provided inside the valve element, and the spring is incorporated in the damper chamber, the diameter of the damper chamber is much smaller than a diameter of a pressure receiving surface of the valve element. Therefore, the damping force is small also from this point of view.

On this account, according to the check valve of the conventional art, in some cases, moving force of the valve element in the axial direction cannot be effectively attenuated by the damper chamber, and therefore, the chattering cannot be suppressed.

An object of the present invention is to provide a check valve capable of effectively suppressing the generation of the chattering.

Solution to Problem

To achieve the above object, a check valve according to the present invention includes: a housing including an inlet channel, a valve chest, and an outlet channel; a seat member provided around the inlet channel, the seat member including a seat portion; a valve element pressed against the seat portion to close the inlet channel; a biasing member configured to push the valve element toward the seat portion; a guide portion provided at the housing and configured to guide the valve element when the valve element moves in an axial direction; and a damper chamber communicating with the valve chest through a space between the valve element and the guide portion, the damper chamber being configured to attenuate axial moving force of the valve element. The biasing member is arranged in the valve chest.

According to this configuration, since the biasing member configured to press the valve element against the seat portion is arranged in the valve chest, the volume of the damper chamber can be made small, and the diameter of the damper chamber can be made large. Thus, the damping force can be made large. Therefore, the axial moving force of the valve element can be attenuated by the large damping force of the damper chamber. Thus, the generation of the chattering can be effectively suppressed.

A sectional area of the damper chamber may be substantially equal to a sectional area of the seat portion.

According to this configuration, the generation of the chattering can be effectively suppressed while maximizing the damping force with respect to the valve element.

The outlet channel may extend from the valve chest in a radial direction of the valve element.

According to this configuration, the fluid flowing into the valve chest is made to flow out in the radial direction of the valve element. Therefore, the pressure loss generated when the fluid flowing in the valve chest flows through a region where the biasing member is provided can be reduced.

The valve element may include a small-diameter portion located around a portion of the valve element which portion is opposed to the outlet channel.

According to this configuration, the fluid flowing into the valve chest smoothly flows from the space formed by the small-diameter portion to the outlet channel extending in the radial direction of the valve element. Thus, the pressure loss can be reduced.

The check valve may further include an additional channel between the valve chest and the damper chamber.

According to this configuration, the stability of the check valve can be increased in such a manner that: the additional channel is further provided in accordance with the size of the valve element and a desired damper effect of the damper chamber; and this makes the flow rate of the fluid flowing in and out from the damper chamber more appropriate.

A shape of a pressure receiving surface of the valve element which surface contacts the seat portion may be a conical shape that spreads from an upstream side toward a downstream side.

According to this configuration, the conical pressure receiving surface of the valve element receives the fluid pressure. With this, the lift amount of the valve element can be made large even when the flow rate is low. Thus, the valve element hardly collides with the seat portion.

The seat portion may be formed such that a sectional area of the seal portion increases from an upstream side toward a downstream side.

According to this configuration, a change in the flow rate of the fluid flowing from the inlet channel to the valve chest can be made smooth.

A portion, located at the valve chest, of the valve element may include a through hole which penetrates the valve element in a direction intersecting with the axial direction of the valve element.

According to this configuration, since the area of a fluid channel extending from the valve chest to the outlet channel increases, the pressure loss by the flow of the fluid can be reduced.

A check valve may include: a housing including an inlet channel, a valve chest, and an outlet channel; a seat member provided around the inlet channel, the seat member including a seat portion; a valve element pressed against the seat portion to close the inlet channel; a biasing member configured to push the valve element toward the seat portion; a guide portion provided at the housing and configured to guide the valve element when the valve element moves in an axial direction; and a damper chamber communicating with the valve chest through a space between the valve element and the valve chest, the damper chamber being configured to attenuate axial moving force of the valve element. The biasing member may be arranged in a biasing member chamber provided at a position opposite to the seat portion across the valve element.

According to this configuration, the biasing member configured to press the valve element against the seat portion is arranged in the biasing member chamber, and the damper portion is made independent. With this, the volume of the damper chamber can be made small, and the diameter of the damper chamber can be made large. Thus, the damping force can be increased. Therefore, the axial moving force of the valve element can be attenuated by the large damping force of the damper chamber. Thus, the generation of the chattering can be effectively suppressed.

Advantageous Effects of Invention

According to the present invention, since the damping force of the valve element by the damper chamber can be made large, the generation of the chattering can be effectively suppressed.

BRIEF DESCRIPTION OF DRAWINGS

FIGS. 2A and 2B are diagrams showing a second check valve according to Embodiment 2 of the present invention.

FIGS. 3A and 3B are diagrams showing a third check valve according to Embodiment 3 of the present invention.

FIGS. 4A and 4B are diagrams showing a fourth check valve according to Embodiment 4 of the present invention.

FIGS. 7A and 7B are diagrams showing a seventh check valve according to Embodiment 7 of the present invention.

DESCRIPTION OF EMBODIMENTS

Hereinafter, embodiments of the present invention will be described with reference to the drawings. The following embodiments will describe an example in which: an upper side in the drawings corresponds to an inlet side; a left side in the drawings corresponds to an outlet side; and a fluid G flows from the upper side to the left side. Moreover, upper, lower, left, and right directions in the present description and the claims correspond to upper, lower, left, and right directions when a first check valve 1 is provided as shown in FIG. 1.

First Check Valve According to Embodiment 1

Figure 1:
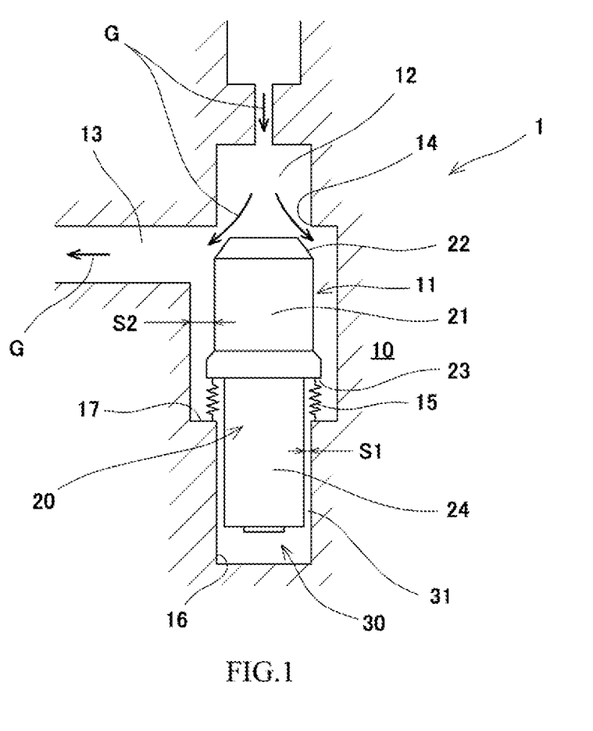
FIG. 1 is a longitudinal sectional view showing a first check valve according to Embodiment 1 of the present invention.

FIG. 1 is a longitudinal sectional view showing the first check valve 1 according to Embodiment 1. A valve element 20 is accommodated in a valve chest 11 formed in a housing 10 of the first check valve 1. The valve chest 11 has a cylindrical section, and the valve element 20 having a columnar section moves in the upper-lower direction. An axial direction of the valve element 20 corresponds to the upper-lower direction shown in the drawings. An inlet channel 12 and an outlet channel 13 are provided at the housing 10. The inlet channel 12 is located at an upper side of the valve chest 11, and the outlet channel 13 is located at a left side of the valve chest 11. A periphery of the inlet channel 12 which opens toward the valve chest 11 serves as a seat portion 14 with which the valve element 20 contacts. In the present embodiment, the housing 10 serves as a seat member. The valve element 20 is pressed against the seat portion 14 to close the inlet channel 12. In the first check valve 1, the fluid G flows from the inlet channel 12 into the valve chest 11 and flows out in the left direction through the outlet channel 13 extending in a radial direction of the valve element 20.

In the valve element 20 of the present embodiment, the shape of a pressure receiving surface of a sealing portion 22 configured to close the seat portion 14 is a conical shape that spreads from an upstream side toward a downstream side along the flow of the fluid G. Since the shape of the pressure receiving surface of the valve element 20 is the conical shape, a lift amount of the valve element 20 is made large even when the flow rate is low. With this, even when the fluid G flows at a low flow rate in a state where the sealing portion 22 is pressed against the seat portion 14 by predetermined set pressure, the valve element 20 largely separates from the seat portion 14. Therefore, even if small pressure fluctuation occurs when the flow rate is low, the valve element 20 hardly collides with the seat portion 14. The set pressure is pressure by which the valve element 20 is pushed toward the seat portion 14 by a spring 15 that is a biasing member.

The valve element 20 includes a large-diameter valve head portion 21 located under the sealing portion 22. A spring receiving portion 23 projecting in a radial direction is provided at a lower portion of the valve head portion 21. A columnar portion 24 smaller in diameter than the valve head portion 21 is provided under the spring receiving portion 23.

The valve chest 11 is large in diameter around the valve head portion 21 of the valve element 20. A small-diameter guide portion 16 is provided under the valve chest 11. The guide portion 16 guides the columnar portion 24 of the valve element 20 in the axial direction. With this, a step portion 17 is formed between the large-diameter valve chest 11 and the small-diameter guide portion 16. The valve element 20 is biased toward the seat portion 14 by the spring 15 provided at the step portion 17. The spring 15 is arranged in the valve chest 11. A compression coil spring which is suitable to be arranged in the fluid G is used as the biasing member of the present embodiment. Other than the spring 15, other elastic bodies, magnetic springs, air springs, or means such as pressing by electrostatic force may be used.

The columnar portion 24 of the valve element 20 is inserted into the guide portion 16. With this, the valve element 20 is guided by the guide portion 16 when moving in the axial direction. A damper chamber 30 is formed between a lower surface of the columnar portion 24 of the valve element 20 and a lower end surface of the guide portion 16 of the housing 10. The damper chamber 30 is arranged at an opposite side of the seat portion 14 across the valve element 20. A connection channel 31 through which the fluid G flows in and out from the damper chamber 30 is formed by a space S1 formed between a periphery of the columnar portion 24 and the guide portion 16. The space S1 of the connection channel 31 is set in accordance with a set value of damping force. The space S1 of the connection channel 31 can be set to, for example, several micrometers to one hundred and several tens of micrometers. A space S2 between the valve chest 11 and the outer shape of the valve element 20 is larger than the space S1 of the connection channel 31. For example, the space S2 can be set to about three or more times the space S1.

By the resistance of the fluid G flowing in and out from the damper chamber 30 through the space S1 of the connection channel 31, the damper chamber 30 attenuates force of the axial movement of the valve element 20 at an opposite side of the seat portion 14. Axial moving force of the valve element 20 that separates from the seat portion 14 and moves in the axial direction can be attenuated by the damper chamber 30. In addition, since the damper chamber 30 is provided at an opposite side of a valve seat across the valve element 20, the damper chamber 30 can directly attenuate the axial moving force acting on the valve element 20 from the seat portion 14 side. With this, the damper chamber 30 can obtain large damping force.

A diameter (damper diameter) of the damper chamber 30 is set large, i.e., is set to be substantially equal to a diameter of the seat portion 14. With this, a sectional area of the damper chamber 30 is set to be substantially equal to a sectional area of the seat portion 14 which is a pressure receiving area for the valve element 20. A possible numerical range of the sectional area of the damper chamber 30 is about 40% to 110% of the pressure receiving area for the valve element 20 (i.e., the sectional area of the seat portion 14 in the first check valve 1). Preferably, the possible numerical range of the sectional area of the damper chamber 30 is 90% to 100% of the pressure receiving area for the valve element 20.

When the sectional area of the damper chamber 30 is set to be substantially equal to the sectional area of the seat portion 14 which is the pressure receiving area for the valve element 20, the damping force by the valve element 20 can be maximized. Then, the pressure of the fluid G acting on the valve element 20 from the seat portion 14 side and the pressure of the fluid G acting on the valve element 20 from the damper chamber 30 side become substantially equal to each other. With this, the pressure of the fluid G acting in the axial direction of the valve element 20 is canceled, and therefore, the valve element 20 can be stably biased by the biasing force of the spring 15 toward the seat portion 14.

In addition, the fluid G flowing in from the inlet channel 12 in the axial direction of the valve element 20 flows toward the outlet channel 13 extending in the radial direction of the valve element 20, and with this, the pressure loss generated when the fluid G flows through a region where the spring 15 is provided is reduced.

The fluid G flowing from the seat portion 14 into the valve chest 11 flows in and out from the damper chamber 30 through the connection channel 31. Since the space S2 between the valve chest 11 and the valve element 20 is made larger than the space S1 of the connection channel 31, the valve chest 11 serves as a buffer, and the pressure of the fluid G flowing from the valve chest 11 through the connection channel 31 into the damper chamber 30 and the pressure of the fluid G flowing out from the damper chamber 30 through the connection channel 31 to the valve chest 11 can be made equal to each other.

In addition, since the spring 15 configured to bias the valve element 20 is arranged in the valve chest 11, the damper chamber 30 can be reduced in volume and made large in diameter. Therefore, the damping force of the first check valve 1 can be made large. For example, a maximum compression ratio of the volume of the damper chamber 30 can be made large, i.e., can be set to two or more, and with this, the damping force can be made large.

According to the first check valve 1 configured as above, the diameter of the damper chamber 30 can be made large, and the volume of the damper chamber 30 can be made small. Therefore, according to the first check valve 1, the damping force by the damper chamber 30 is made large, and with this, the generation of the chattering can be effectively suppressed.

Second Check Valve According to Embodiment 2

Figure 2A:
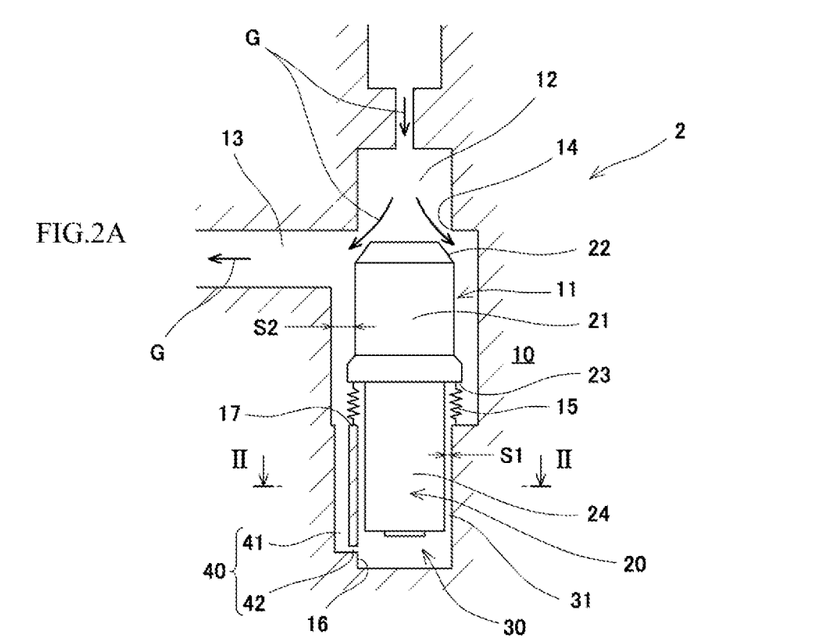
FIG. 2A is a longitudinal sectional view.
Figure 2B:
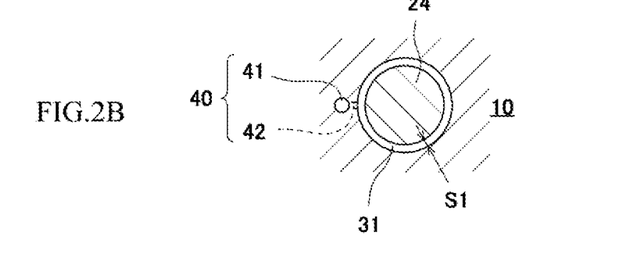
FIG. 2B is a sectional view taken along line II-II.

FIGS. 2A and 2B are diagrams showing a second check valve 2 according to Embodiment 2. FIG. 2A is a longitudinal sectional view, and FIG. 2B is a sectional view taken along line II-II. The second check valve 2 is configured such that an additional channel 40 is further provided at the first check valve 1. In the following description, the same reference signs are used for the same components as in the first check valve 1, and a repetition of the same explanation is avoided.

In the second check valve 2, the additional channel 40 through which the fluid G flows in and out from the damper chamber 30 is further provided between the valve chest 11 and the damper chamber 30. The additional channel 40 of the second check valve 2 is provided at the housing 10. The housing 10 includes a first channel 41 which extends in parallel with the guide portion 16 from the valve chest 11 toward a lowermost portion of the damper chamber 30. A lowermost portion of the first channel 41 and the damper chamber 30 communicate with each other through a second channel 42. The additional channel 40 of the second check valve 2 includes the first channel 41 and the second channel 42. The additional channel 40 can constitute a channel through which the fluid G flows in and out from the damper chamber 30 and which has a variation value set by adjusting the sectional area of the channel. The sectional area of the additional channel 40 can be set in accordance with the pressure of the fluid the size of the valve element 20, and the like. The amount of fluid G flowing from the valve chest 11 to the damper chamber 30 and the amount of fluid G flowing from the damper chamber 30 to the valve chest 11 can be increased by the additional channel 40.

According to the second check valve 2, the sectional area of the additional channel 40 having the variation value is added to the sectional area of the connection channel 31 having a fixed value and formed between the periphery of the columnar portion 24 and the guide portion 16 in the first check valve 1. Since the other components of the second check valve 2 are the same as those of the first check valve 1, explanations thereof are omitted.

According to the second check valve 2, the flow rate of the fluid G flowing in and out from the damper chamber 30 can be adjusted to an appropriate flow rate by the additional channel 40 in accordance with the pressure of the fluid the size of the valve element 20, setting of a damper effect of the damper chamber 30, and the like. According to the second check valve 2, the diameter of the damper chamber 30 can be made large, and the volume of the damper chamber 30 can be made small. Therefore, according to the second check valve 2, the damping force of the damper chamber 30 is made large, and with this, the generation of the chattering can be effectively suppressed.

Third Check Valve According to Embodiment 3

Figure 3A:
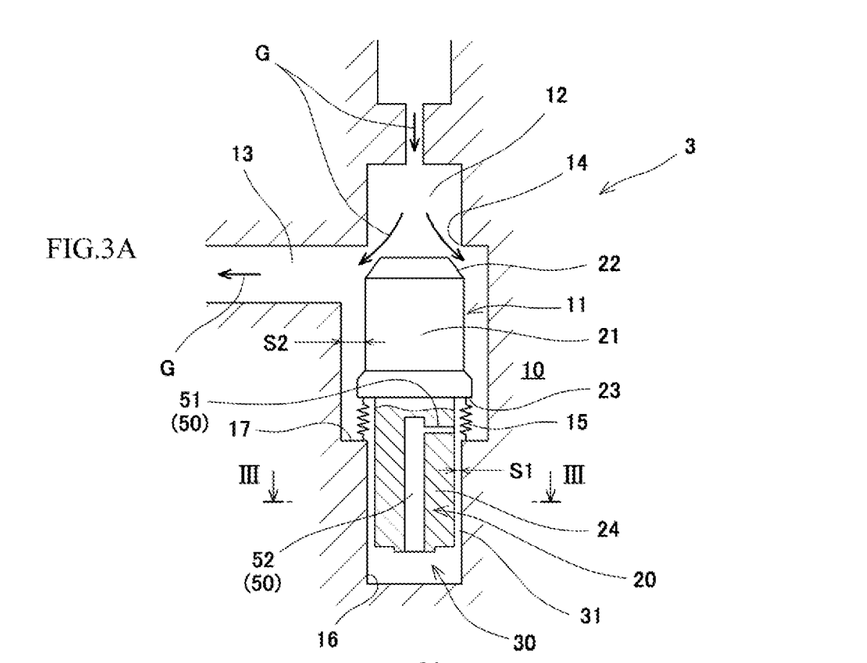
FIG. 3A is a longitudinal sectional view.
Figure 3B:
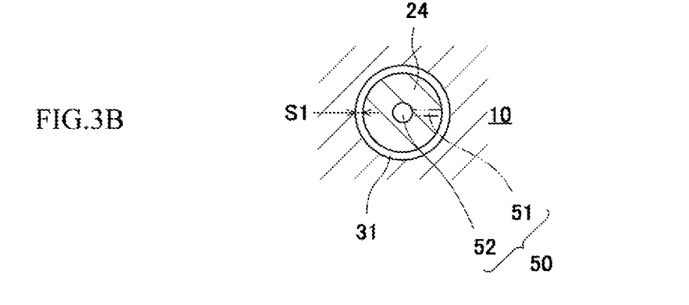
FIG. 3B is a sectional view taken along line III-III.

FIGS. 3A and 3B are diagrams showing a third check valve 3 according to Embodiment 3. FIG. 3A is a longitudinal sectional view, and FIG. 3B is a sectional view taken along line III-III. The third check valve 3 is different from the second check valve 2 regarding an additional channel 50. In the following description, the same reference signs are used for the same components as in the second check valve 2, and a repetition of the same explanation is avoided.

In the third check valve 3, the additional channel 50 through which the fluid G flows in and out from the damper chamber 30 is further provided between the valve chest 11 and the damper chamber 30. The additional channel 50 of the third check valve 3 is provided at the valve element 20. A third channel 51 is provided at a portion of the valve element 20 which portion is located at the valve chest 11. The third channel 51 extends from an outer peripheral portion of the valve element 20 to a center-axis portion of the valve element 20. The third channel 51 communicates with a fourth channel 52 provided at the center-axis portion of the valve element 20. The fourth channel 52 communicates with the damper chamber 30 at a lower end of the columnar portion 24 of the valve element 20. The additional channel 50 of the third check valve 3 includes the third channel 51 and the fourth channel 52. The additional channel 50 can constitute a channel through which the fluid G flows in and out from the damper chamber 30 and which has a variation value set by adjusting the sectional area of the channel. The sectional area of the additional channel 50 can be set in accordance with the pressure of the fluid G, the size of the valve element 20, and the like. The amount of fluid G flowing from the valve chest 11 to the damper chamber 30 and the amount of fluid G flowing from the damper chamber 30 to the valve chest 11 can be increased by the additional channel 50.

According to the third check valve 3, the sectional area of the additional channel 50 having the variation value is added to the sectional area of the connection channel 31 having a fixed value and formed between the periphery of the columnar portion 24 and the guide portion 16 in the first check valve 1. Since the other components of the third check valve 3 are the same as those of the second check valve 2, explanations thereof are omitted.

According to the third check valve 3, the flow rate of the fluid G flowing in and out from the damper chamber 30 can be adjusted to an appropriate flow rate by the additional channel 50 in accordance with the pressure of the fluid G, the size of the valve element 20, the setting of the damper effect of the damper chamber 30, and the like. According to the third check valve 3, the diameter of the damper chamber 30 can be made large, and the volume of the damper chamber 30 can be made small. Therefore, according to the third check valve 3, the damping force of the damper chamber 30 is made large, and with this, the generation of the chattering can be effectively suppressed.

Fourth Check Valve According to Embodiment 4

Figure 4A:
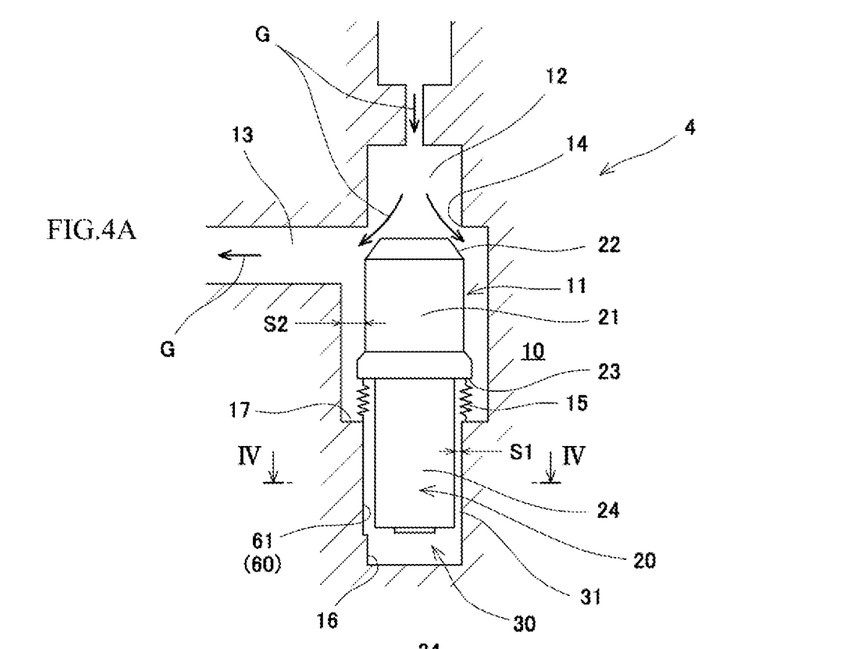
FIG. 4A is a longitudinal sectional view.
Figure 4B:
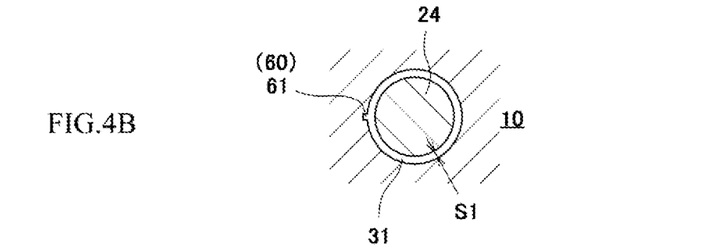
FIG. 4B is a sectional view taken along line IV-IV.

FIGS. 4A and 4B are diagrams showing a fourth check valve 4 according to Embodiment 4. FIG. 4A is a longitudinal sectional view, and FIG. 4B is a sectional view taken along line IV-IV. The fourth check valve 4 is different from the second check valve 2 regarding an additional channel 60. In the following description, the same reference signs are used for the same components as in the second check valve 2, and a repetition of the same explanation is avoided.

In the fourth check valve 4, the additional channel 60 through which the fluid G flows in and out from the damper chamber 30 is further provided between the valve chest 11 and the damper chamber 30. The additional channel 60 of the fourth check valve 4 is provided at the guide portion 16. A fifth channel 61 is provided at the guide portion 16. The fifth channel 61 extends from the valve chest 11 to the vicinity of a lowermost portion of the damper chamber 30. The additional channel 60 of the fourth check valve 4 includes the fifth channel 61. The additional channel 60 can constitute a channel through which the fluid G flows in and out from the damper chamber 30 and which has a variation value set by adjusting the sectional area of the channel. The sectional area of the additional channel 60 can be set in accordance with the pressure of the fluid the size of the valve element 20, and the like. The amount of fluid G flowing from the valve chest 11 to the damper chamber 30 and the amount of fluid G flowing from the damper chamber 30 to the valve chest 11 can be increased by the additional channel 60.

According to the fourth check valve 4, the sectional area of the additional channel 60 having the variation value is added to the sectional area of the connection channel 31 having a fixed value and formed between the periphery of the columnar portion 24 and the guide portion 16 in the first check valve 1. Since the other components of the fourth check valve 4 are the same as those of the second check valve 2, explanations thereof are omitted.

According to the fourth check valve 4, the flow rate of the fluid G flowing in and out from the damper chamber 30 can be adjusted to an appropriate flow rate by the additional channel 60 in accordance with the pressure of the fluid G, the size of the valve element 20, the setting of the damper effect of the damper chamber 30, and the like. According to the fourth check valve 4, the diameter of the damper chamber 30 can be made large, and the volume of the damper chamber 30 can be made small. Therefore, according to the fourth check valve 4, the damping force of the damper chamber 30 is made large, and with this, the generation of the chattering can be effectively suppressed.

Fifth Check Valve According to Embodiment 5

Figure 5:
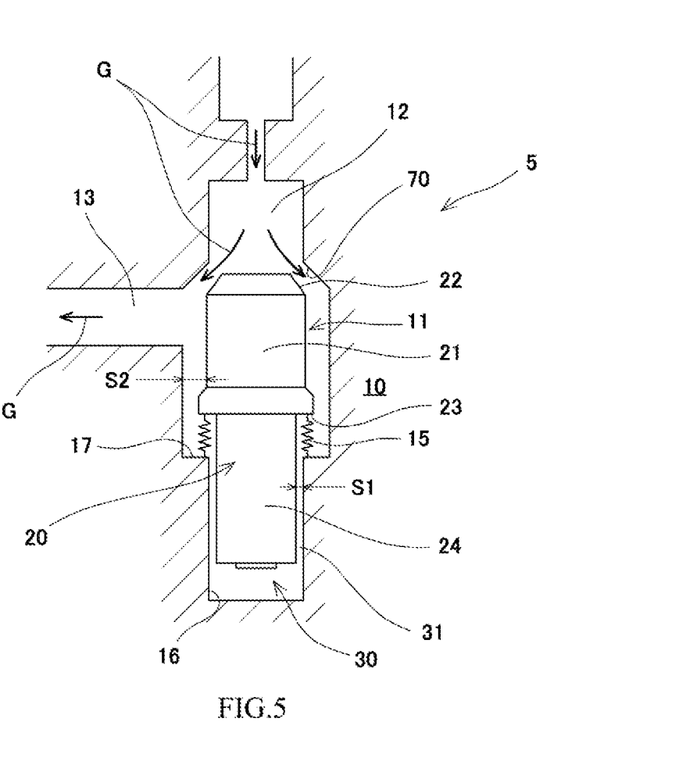
FIG. 5 is a longitudinal sectional view showing a fifth check valve according to Embodiment 5 of the present invention.

FIG. 5 is a longitudinal sectional view showing a fifth check valve according to Embodiment 5. A fifth check valve 5 is different from the first check valve 1 regarding the shape of a valve seat 70. In the following description, the same reference signs are used for the same components as in the first check valve 1, and a repetition of the same explanation is avoided.

The valve seat 70 of the fifth check valve 5 is formed so as to spread in a tapered shape from the inlet channel 12 toward the valve chest 11. To be specific, the valve seat 70 is formed such that the sectional area thereof increases from the upstream side toward the downstream side along the flow of the fluid G. The valve seat 70 may be curved so as to spread from the inlet channel 12 toward the valve chest 11. Since the other components of the fifth check valve 5 are the same as those of the first check valve 1, explanations thereof are omitted.

According to the fifth check valve 5 configured as above, a change in the flow rate of the fluid G flowing from the inlet channel 12 to the valve chest 11 with respect to an opening operation of the valve element 20 can be made smooth. Since the change in the flow rate of the fluid G is made smooth, the opening operation of the valve element 20 can also be made smooth. It should be noted that since the suppression of the generation of the chattering is the same as that in the first check valve 1, an explanation thereof is omitted.

Sixth Check Valve According to Embodiment 6

Figure 6:
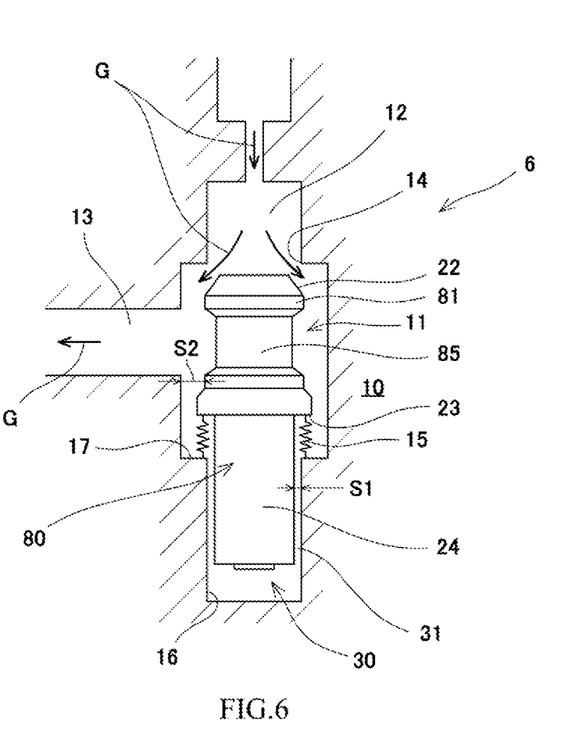
FIG. 6 is a longitudinal sectional view showing a sixth check valve according to Embodiment 6 of the present invention.

FIG. 6 is a longitudinal sectional view showing a sixth check valve 6 according to Embodiment 6. The sixth check valve 6 is different from the first check valve 1 regarding the shape of a valve element 80. In the following description, the same reference signs are used for the same components as in the first check valve 1, and a repetition of the same explanation is avoided.

In the valve element 80 of the sixth check valve 6, a small-diameter portion 85 is provided at a valve head portion 81. The small-diameter portion 85 is provided at the periphery of the valve head portion 81 so as to be opposed to the outlet channel 13. An axially intermediate portion of the valve head portion 81 is made small in diameter by the small-diameter portion 85. A space of the valve chest 11 which space is located close to the outlet channel 13 is made large by the small-diameter portion 85. Since the other components of the sixth check valve 6 are the same as those of the first check valve 1, explanations thereof are omitted.

According to the sixth check valve 6 configured as above, the large space can be secured by the small-diameter portion 85 at a portion of the valve chest 11 which portion is opposed to the outlet channel 13. Therefore, the fluid G entering into the valve chest 11 smoothly flows from the space formed by the small-diameter portion 85 to the outlet channel 13 extending in the radial direction. Thus, the pressure loss can be reduced. Moreover, in the valve element 80, the weight of the valve head portion 81 is reduced by the small-diameter portion 85. Therefore, the gravity center position of the valve element 80 moves toward the columnar portion 24. Since the gravity center position of the valve element 80 approaches the guide portion 16, lateral vibration of the valve element 80 is suppressed. It should be noted that the suppression of the generation of the chattering is the same as that in the first check valve 1, an explanation thereof is omitted.

Seventh Check Valve According to Embodiment 7

Figure 7A:
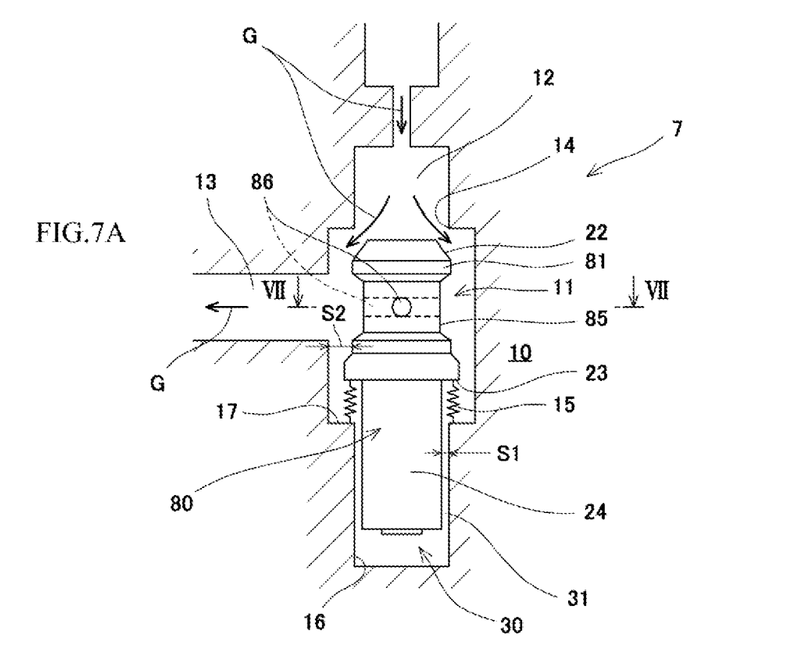
FIG. 7A is a longitudinal sectional view.
Figure 7B:
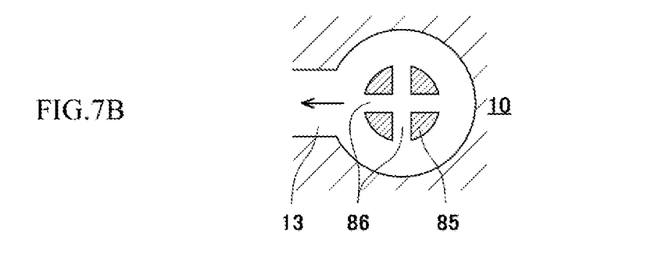
FIG. 7B is a sectional view taken along line VII-VII.

FIGS. 7A and 7B are diagrams showing a seventh check valve 7 according to Embodiment 7. FIG. 7A is a longitudinal sectional view, and FIG. 7B is a sectional view taken along line VII-VII. The seventh check valve 7 is different from the sixth check valve 6 regarding the valve head portion 81 of the valve element 80. In the following description, the same reference signs are used for the same components as in the sixth check valve 6, and a repetition of the same explanation is avoided.

In the seventh check valve 7, through holes 86 are provided at the small-diameter portion 85 of the valve head portion 81. The through holes 86 are provided in directions intersecting with the axial direction of the valve element 80. The through holes 86 of the present embodiment are provided in directions perpendicular to the axial direction of the valve element 80. As shown in FIG. 7B, two through holes 86 are provided at intervals of 90° in a circumferential direction of the small-diameter portion 85 and communicate with each other at a shaft center portion of the valve element 80. Since the other components of the seventh check valve 7 are the same as those of the sixth check valve 6, explanations thereof are omitted.

According to the seventh check valve 7 configured as above, in addition to the reduction in the pressure loss by the large space secured by the small-diameter portion 85 as with the sixth check valve 6, the area of a passage through which the fluid G flows from the valve chest 11 toward the outlet channel 13 is increased by the through holes 86, and therefore, the pressure loss of the fluid flowing from the valve chest 11 toward the outlet channel 13 can be further reduced. It should be noted that since the suppression of the generation of the chattering is the same as that in the sixth check valve 5, and explanation thereof is omitted.

Eighth Check Valve According to Embodiment 8

Figure 8:
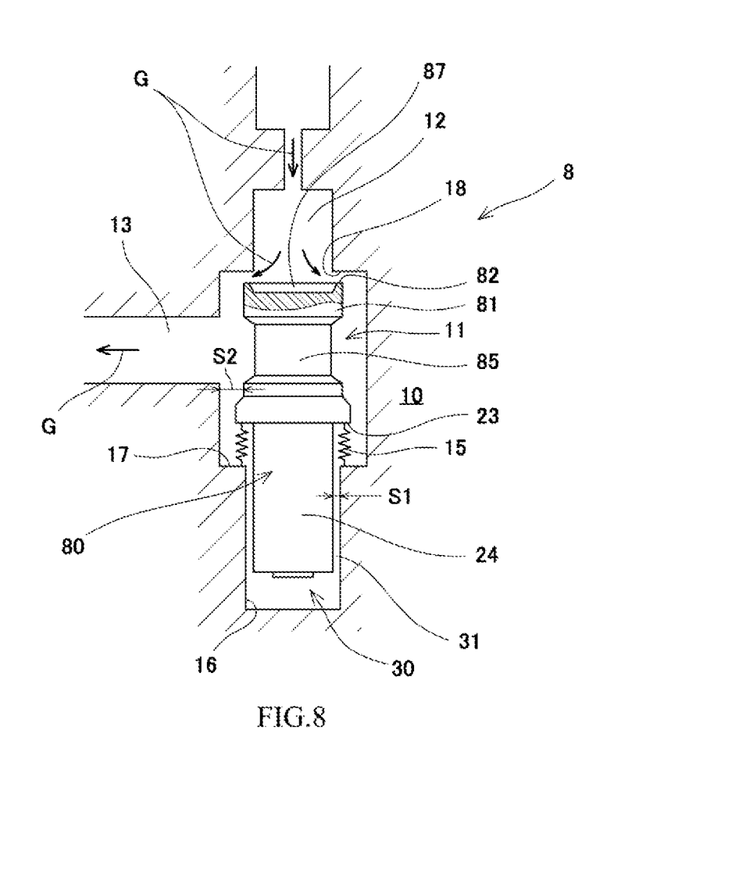
FIG. 8 is a longitudinal sectional view showing an eighth check valve according to Embodiment 8 of the present invention.

FIG. 8 is a longitudinal sectional view showing an eighth check valve 8 according to Embodiment 8. The eighth check valve 8 is different from the sixth check valve 6 regarding the structures of a sealing portion 22 of the valve head portion 81 of the valve element 80 and a seat portion 18. In the following description, the same reference signs are used for the same components as in the sixth check valve 6, and a repetition of the same explanation is avoided.

In the eighth check valve 8, an upper end portion of the valve head portion 81 includes the sealing portion 82 having a planar shape. The sealing portion 82 is provided at an outer peripheral portion of the valve head portion 81, and a concave portion 87 is provided at a middle portion of the valve head portion 81. The movement of the valve element 80 in the axial direction is stabilized by providing the concave portion 87. The seat portion 18 is formed on a flat surface perpendicular to the axial direction of the valve element 80. When the valve element 80 is biased toward the seat portion 18, the sealing portion 82 of the valve head portion 81 is pressed against the seat portion 18 to close the inlet channel 12. Since the other components of the eighth check valve 8 are the same as those of the sixth check valve 6, explanations thereof are omitted.

According to the eighth check valve 8 configured as above, time and labor required for the production of the sealing portion 82 of the valve head portion 81 and the seat portion 18 can be reduced. Moreover, as with the sixth check valve 6, the pressure loss can be reduced by the large space secured by the small-diameter portion 85. It should be noted that since the suppression of the generation of the chattering is the same as that in the sixth check valve 6, an explanation thereof is omitted.

Ninth Check Valve According to Embodiment 9

Figure 9:
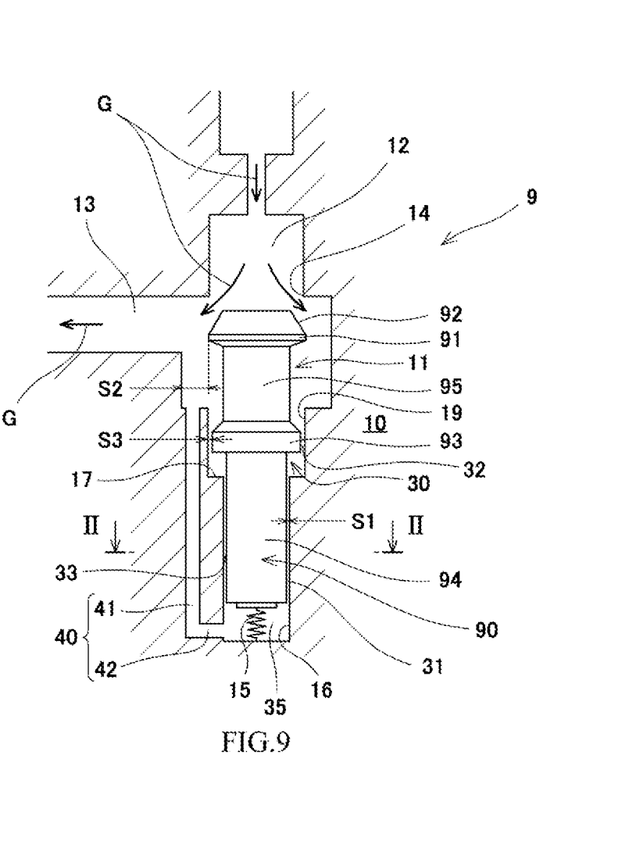
FIG. 9 is a longitudinal sectional view showing a ninth check valve according to Embodiment 9 of the present invention.

FIG. 9 is a longitudinal sectional view showing a ninth check valve 9 according to Embodiment 9. In the following description, the same reference signs are used for the same components as in the first check valve 1. A valve element 90 is accommodated in the valve chest 11 formed in the housing 10 of the ninth check valve 9. The valve chest 11 has a cylindrical section, and the valve element 90 having a columnar section moves in the upper-lower direction. The axial direction of the valve element 90 corresponds to the upper-lower direction shown in FIG. 9. The inlet channel 12 and the outlet channel 13 are provided at the housing 10. The inlet channel 12 is located at an upper side of the valve chest 11, and the outlet channel 13 is located at a left side of the valve chest 11. A periphery of the inlet channel 12 which opens toward the valve chest 11 serves as the seat portion 14 with which the valve element 20 contacts. The valve element 20 is pressed against the seat portion 14 to close the inlet channel 12. According to the ninth check valve 9, the fluid G flows from the inlet channel 12 into the valve chest 11 and flows out in the left direction through the outlet channel 13 extending in the radial direction of the valve element 90.

In the valve element 90 of the present embodiment, the shape of a pressure receiving surface of a sealing portion 92 configured to close the seat portion 14 is a conical shape that spreads from the upstream side toward the downstream side along the flow of the fluid G. Since the shape of the pressure receiving surface of the valve element 90 is a conical shape, the lift amount of the valve element 90 is made large even when the flow rate is low.

The valve element 90 includes a valve head portion 91 located under the sealing portion 92. A small-diameter portion 95 smaller in diameter than an outer diameter of the sealing portion 92 is provided at the valve head portion 91. A flange-shaped projecting portion 93 projecting in the radial direction is provided at a lower portion of the small-diameter portion 95. A columnar portion 94 smaller in diameter than the small-diameter portion 95 of the valve head portion 21 is provided under the flange-shaped projecting portion 93.

The valve chest 11 is large in diameter around the valve head portion 91 of the valve element 90. A damper portion 19 having an intermediate diameter is provided under the valve chest 11. The damper portion 19 is provided within a range where the flange-shaped projecting portion 93 moves in the axial direction. The small-diameter guide portion 16 is provided under the damper portion 19. The small-diameter guide portion 16 guides the columnar portion 94 of the valve element 90 in the axial direction. With this, the step portion 17 is formed between the intermediate-diameter damper portion 19 and the small-diameter guide portion 16.

The columnar portion 94 of the valve element 90 is inserted into the guide portion 16. With this, the valve element 90 is guided by the guide portion 16 when moving in the axial direction. A spring chamber 35 is provided between a lower surface of the columnar portion 94 of the valve element 90 and a lower end surface of the guide portion 16 of the housing 10. The spring chamber 35 communicates with the valve chest 11 through the additional channel 40 including the first channel 41 and the second channel 42. The first channel 41 is provided at the housing 10. A lowermost portion of the first channel 41 and the spring chamber 35 communicate with each other through the second channel 42. The spring 15 is a compression coil spring and is arranged in the spring chamber 35. The fluid in the spring chamber 35 is discharged to the valve chest 11 through the additional channel 40. The valve element 90 is biased toward the seat portion 14 by the spring 15 provided in the spring chamber 35.

The damper chamber 30 is formed between a lower surface of the flange-shaped projecting portion 93 of the valve element 90 and the step portion 17 formed between the damper portion 19 and the guide portion 16. The damper chamber 30 is provided at an axially intermediate portion of the valve element 90. A first connection channel 32 through which the fluid G flow in and out from the damper chamber 30 is formed between a periphery of the flange-shaped projecting portion 93 and the damper portion 19. The first connection channel 32 is formed by a space S3. A second connection channel 33 is formed between a periphery of the columnar portion 94 of the valve element 90 and the guide portion 16. The second connection channel 33 is formed by the space S1. The space S3 is larger than the space S1. To be specific, there is a relation "S3>S1." The spaces S3 and S1 are set in accordance with the set value of the damping force. The space S1 can be set to, for example, about several micrometers to one hundred and several tens of micrometers. The space S3 can be set to, for example, about 1.5 times the space S1.

By the resistance of the fluid G flowing in and out from the damper chamber 30 through the space S3 of the first connection channel 32 and the space S1 of the second connection channel 33, the damper chamber 30 can attenuate the axial moving force of the valve element 90 that separates from the seat portion 14 and moves in the axial direction. In addition, the damper chamber 30 can directly attenuate the axial moving force acting on the valve element 90 from the seat portion 14 side. With this, the damper chamber 30 can obtain large damping force.

Moreover, according to the present embodiment, the diameter (damper diameter) of the damper chamber 30 is set to be larger than the diameter of the seat portion 14. However, the sectional area of the damper chamber 30 is set to be substantially equal to the sectional area of the seat portion 14 which is the pressure receiving area for the valve element 90. A possible numerical range of the sectional area of the damper chamber 30 is about 40% to 110% of the pressure receiving area for the valve element 90 (i.e., the sectional area of the seat portion 14 in the ninth check valve 9). Preferably, the possible numerical range of the sectional area of the damper chamber 30 is 90% to 100% of the pressure receiving area for the valve element 90.

When the sectional area of the damper chamber 30 is set to be substantially equal to the pressure receiving area for the valve element 90, the damping force generated by the valve element 90 can be maximized. The pressure of the fluid G acting on the valve element 90 from the seat portion 14 side and the pressure of the fluid G acting on the valve element 90 from the damper chamber 30 side become substantially equal to each other. With this, the pressure of the fluid G acting in the axial direction of the valve element 90 is canceled, and therefore, the valve element 90 can be stably biased by the biasing force of the spring 15 toward the seat portion 14.

In addition, the fluid G flowing in from the inlet channel 12 in the axial direction of the valve element 90 flows from the large space, formed by the small-diameter portion 95 of the valve head portion 91, toward the outlet channel 13 extending in the radial direction of the valve element 90, and with this, the pressure loss of the fluid G is reduced.

According to the ninth check valve 9 configured as above, the diameter of the damper chamber 30 can be made large, and the volume of the damper chamber 30 can be made small. Therefore, according to the ninth check valve 9, the damping force by the damper chamber 30 is made large, and with this, the generation of the chattering can be effectively suppressed.

CONCLUSION

As above, according to the check valves 1 to 9, when the valve head portion 21 of the valve element 20 separates from the seat portion 14, the axial moving force can be effectively attenuated by the damper chamber 30 having a small volume and a large diameter. Therefore, the chattering of the valve element 20 can be effectively suppressed.

By suppressing the generation of the chattering, the vibration of the check valves 1 to 9 and the collision of the check valves 1 to 9 caused by the vibration can be suppressed. By suppressing the collision of the valve, the durability of the components (the valve elements 20, the seat members (members including the seat portions 14), the springs, etc.) of the check valves 1 to 9 can be improved. Moreover, pulsation and vibration of connection pipes due to the vibration of the valve and influence on connection devices can be reduced.

Therefore, according to the check valves 1 to 9, the chattering of the check valves 1 to 9 can be effectively suppressed not only in check valves incorporated in gas tank control valves but also in hydraulic devices, pneumatic devices, various types of plant control, and the like including channels through which the fluid G (gas or liquid, such as water) flows.

Other Modified Example

The valve element 20 of the above embodiments is one example. The forms of the connection channel 31 and the additional channels 40, 50, and 60 can be changed in accordance with the setting of the damping force of the damper chamber 30. For example, a plurality of additional channels (40, 60) may be provided around the guide portion 16. These configurations are not limited to the above embodiments.

The above embodiments are examples. Various modifications may be made within the scope of the present invention. The configurations of the embodiments may be combined with each other, and the present invention is not limited to the above embodiments.

REFERENCE SIGNS LIST 1 first check valve
2 second check valve
3 third check valve
4 fourth check valve
5 fifth check valve
6 sixth check valve
7 seventh check valve
8 eighth check valve
9 ninth check valve
10 housing
11 valve chest
12 inlet channel
13 outlet channel
14 seat portion
15 spring (biasing member)
16 guide portion
19 damper portion
20 valve element
21 valve head portion
24 columnar portion
30 damper chamber
31 connection channel
35 spring chamber (biasing member chamber)
40 additional channel
41 first channel
42 second channel
50 additional channel
51 third channel
52 fourth channel
60 additional channel
61 fifth channel
70 valve seat (seat portion)
80 valve element
85 small-diameter portion
86 through hole
90 valve element
91 valve head portion
95 flange-shaped projecting portion
S1 space
S2 space
G fluid

The invention claimed is:

1. A check valve comprising:
a housing including an inlet channel, a valve chest, and an outlet channel;
a seat member provided around the inlet channel, the seat member including a seat portion;
a valve element pressed against the seat portion to close the inlet channel, the valve element including a valve head portion provided on an inlet channel side, a columnar portion provided on a side opposite to the inlet channel, and a spring receiving portion provided between the valve head portion and the columnar portion, the spring receiving portion having a diameter larger than a diameter of the columnar portion;
a spring configured to be externally attached to the columnar portion and connected to the spring receiving portion, and to push the valve element toward the seat portion;
a guide portion provided at the housing and configured to guide the valve element when the valve element moves in an axial direction; and
a damper chamber communicating with the valve chest through a space between the valve element and the guide portion, the damper chamber being configured to attenuate axial moving force of the valve element, wherein:
the spring is arranged in the valve chest,
a sectional area of the damper chamber is 90% to 100% of a pressure receiving area of the valve element, the pressure receiving area of the valve element being a sectional area of the seat portion in contact of the valve element, and
a maximum compression ratio of the volume of the damper chamber is 2 or more.

2. The check valve according to claim 1, wherein the sectional area of the damper chamber is substantially equal to the sectional area of the seat portion.

3. The check valve according to claim 1, wherein the outlet channel extends from the valve chest in a radial direction of the valve element.

4. The check valve according to claim 3, wherein the valve element includes a small-diameter portion located around a portion of the valve element which portion is opposed to the outlet channel.

5. The check valve according to claim 1, further comprising an additional channel between the valve chest and the damper chamber.

6. The check valve according to claim 1, wherein a shape of a pressure receiving surface of the valve element which surface contacts the seat portion is a conical shape that spreads from an upstream side toward a downstream side.

7. The check valve according to claim 1, wherein the seat portion is formed such that a sectional area of the seat portion increases from an upstream side toward a downstream side.

8. The check valve according to claim 1, wherein a portion, located at the valve chest, of the valve element includes a through hole which penetrates the valve element in a direction intersecting with the axial direction of the valve element.

* * * * *